Feb. 12, 1935. O. HAMPKE 1,991,054
POCKET MIRROR FOR REFLECTING POSITIVE IMAGES
Filed Jan. 13, 1933
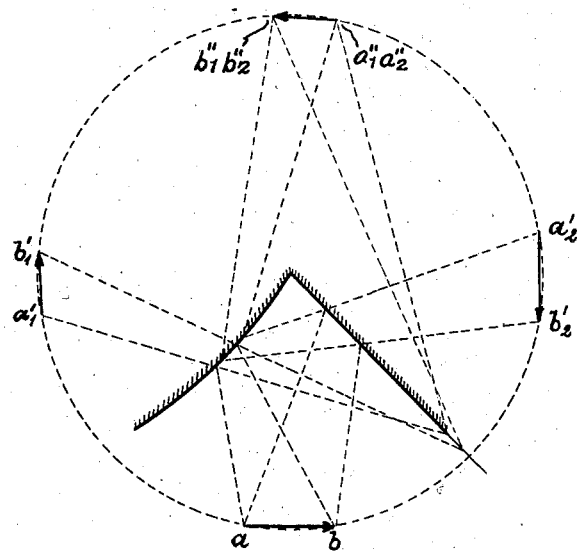
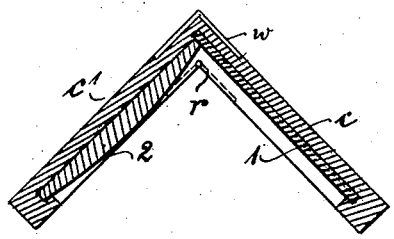
Fig. 2.
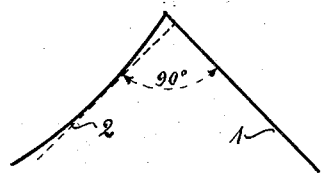
Fig. 5.
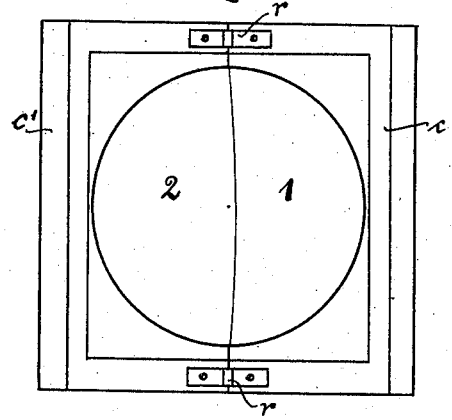
Fig. 4.
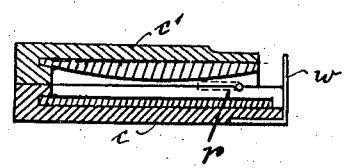
Fig. 3

Patented Feb. 12, 1935

1,991,054

UNITED STATES PATENT OFFICE 1,991,054

POCKET MIRROR FOR REFLECTING POSITIVE IMAGES

Otto Hampke, Altona, Germany

Application January 13, 1933, Serial No. 651,650

1 Claim. (Cl. 88—1)

It is known that if two mirrors are placed at right angles to one another with their adjacent edges in contact, an image the right way round is obtained.

The object of the invention is to construct such a mirror as a pocket mirror which enables the whole of the face to be viewed in a small mirror. For this purpose one of the mirror surfaces can be convex whereas the other is plane.

Making one of the mirror surfaces convex presents the advantage, that such a mirror can be employed in three ways, namely as an ordinary plane mirror, as an ordinary convex mirror and as a mirror reflecting an image the right way round and in reduced size.

The radius of curvature of the convex mirror must not be less than a certain length, and the convexity of the convex mirror must not be more than a certain degree if the reduced image the right way round is to remain free from distortions. Consequently there is a minimum for the radius of curvature and a maximum for the convexity.

The radius of curvature has also a maximum limit with regard to the reduction in size of the image. At the same time the fact must be advantageously utilized that also relatively large pocket mirrors can be accommodated in ladies' hand bags and that moreover the pocket mirror showing an image the right way round can be made foldable.

The limit measurements of the radius of curvature lie between 36 mms. and 700 mms., and the maximum size of the convexity, that is the gauge, has been ascertained as 1/11 of the co-ordinate chord.

A pocket mirror constructed according to the invention is illustrated by way of example in the accompanying drawing:—

Fig. 1 shows a mirror with a convex mirror surface and with a plane mirror surface.

Figs. 2 and 3 are cross sections of a mirror with two mirror surfaces which viewed in the diagonal, form together a circle.

Fig. 4 shows an internal view of a pocket mirror in position for use.

Fig. 5 illustrates the correct position of the two mirror surfaces of a pocket mirror in the position for use.

The trajectory of the rays in the case of a mirror with one convex and one plane mirror surface is shown in Fig. 1. All the light rays emanating from the point $a$ impinging on the plane mirror 1 produce the image point $a'2$; the rays emanating from this image point and impinging on the mirror 2 produce the image point $a''2$. On the other hand the light rays emanating from $a$ and first impinging upon the mirror 2 produce the image point $a'1$ and a second image point $a''1$. The image points $a''1$ and $a''2$ coincide. That which has been stated for point $a$ is valid for the point $b$. The image points $b''1$ and $b''2$ likewise coincide. The image situated between the points $a''1$, $a''2$ and $b''1$, $b''2$, appears the right way round and reduced in size.

In order that the mirror does not occupy too much space, it can be foldable and constructed so that the two mirror surfaces of the open mirror can be easily placed at right angles to one another.

Figs. 2 and 3 show the mirror in cross section, the two mirror surfaces together, viewed in the diagonal, forming a circle, which is favourable for viewing the face. The mirror may however also have any other shape.

If a pocket mirror is in position for use as shown in the internal view (Fig. 4), each of the two mirror surfaces which in the example illustrated are in the shape of a semi-ellipse, is mounted in a frame $c$, $c'$ made of wood, metal or any other material. The mirrors proper may be made of glass or metal. The frames surround the mirrors only on three sides, because the two mirror surfaces must be in contact on the fourth side. The two frames are interconnected by hinges $r$. Further, the mirrors are prevented by an angular stop piece $w$ from being swung through more than 90°. When the convex mirror 2 has swung through an angle of 90° the back wall of its frame comes into contact with the stop piece $w$ and its free edge stands perpendicularly on the free edge of the plane mirror 1 at $w$. This angle of 90° must be formed between the tangent drawn in the centre of the convex mirror 2 and the plane mirror 1 as shown in Fig. 5.

I claim:—

A pocket mirror for reflecting reduced positive images, comprising two mirror surfaces arranged at right angles to each other and contacting at one edge, one mirror surface being plane and the other sphero-convex with a radius of curvature of not less than 36 mms.

OTTO HAMPKE.